(12) United States Patent
Chu

(10) Patent No.: US 9,343,976 B2
(45) Date of Patent: May 17, 2016

(54) POWER SUPPLY APPARATUS WITH DISCHARGE CIRCUIT

(71) Applicant: Power Forest Technology Corporation, Hsinchu (TW)

(72) Inventor: Kwan-Jen Chu, Hsinchu (TW)

(73) Assignee: Power Forest Technology Corporation, Hsinchu County (TW)

( * ) Notice: Subject to any disclaimer, the term of this patent is extended or adjusted under 35 U.S.C. 154(b) by 30 days.

(21) Appl. No.: 14/303,572

(22) Filed: Jun. 12, 2014

(65) Prior Publication Data

US 2015/0288286 A1     Oct. 8, 2015

(30) Foreign Application Priority Data

Apr. 3, 2014   (TW) .............................. 103112580 A

(51) Int. Cl.
| | |
|---|---|
| *H02M 3/335* | (2006.01) |
| *H02M 7/06* | (2006.01) |
| *H02M 1/44* | (2007.01) |
| *H02M 1/00* | (2006.01) |
| *H02M 1/32* | (2007.01) |

(52) U.S. Cl.
CPC ............ *H02M 3/33507* (2013.01); *H02M 7/06* (2013.01); *H02M 1/44* (2013.01); *H02M 2001/007* (2013.01); *H02M 2001/0012* (2013.01); *H02M 2001/322* (2013.01)

(58) Field of Classification Search
CPC ... H02M 2001/322; H02M 7/06; H02M 1/32; H02M 3/33507; H02M 1/44; H02M 2001/0012; H02M 2001/007
See application file for complete search history.

(56) References Cited

U.S. PATENT DOCUMENTS

| 5,090,291 | A | * | 2/1992 | Schwartz | ............. | G10H 1/0575 |
|---|---|---|---|---|---|---|
| | | | | | | 84/603 |
| 5,650,715 | A | | 7/1997 | Massie | | |
| 2011/0025278 | A1 | | 2/2011 | Balakrishnan et al. | | |
| 2011/0176341 | A1 | | 7/2011 | Huang | | |
| 2012/0105016 | A1 | * | 5/2012 | Moon | ..................... | H02M 1/36 |
| | | | | | | 320/166 |
| 2012/0169313 | A1 | * | 7/2012 | Lee | ..................... | H02M 1/4225 |
| | | | | | | 323/282 |

(Continued)

FOREIGN PATENT DOCUMENTS

| CN | 102263516 | 11/2011 |
|---|---|---|
| CN | 102545195 | 7/2012 |

(Continued)

OTHER PUBLICATIONS

"Office Action of Taiwan Counterpart Application", issued on Jul. 17, 2015, p. 1-p. 9.

*Primary Examiner* — Jue Zhang
*Assistant Examiner* — Lakaisha Jackson
(74) *Attorney, Agent, or Firm* — Jianq Chyun IP Office

(57) ABSTRACT

A power supply apparatus is provided. The power supply apparatus includes a power conversion circuit, an AC safety capacitor and a control unit. An AC input voltage is received by an input side of the power converting circuit, and is converted to a DC output voltage. The AC safety capacitor is connected across the input side. The control unit controls the operation of the power converting circuit, where the control unit samples and holds a voltage between two terminals of the AC safety capacitor to obtain a holding voltage, and compares the holding voltage and the AC input voltage during each period of a clock signal, so as to decide to discharge electric energy stored by the AC safety capacitor according to a comparison result.

11 Claims, 4 Drawing Sheets

(56) References Cited

U.S. PATENT DOCUMENTS

| | | | |
|---|---|---|---|
| 2013/0033236 A1* | 2/2013 | Li | H02M 7/219 |
| | | | 320/166 |
| 2013/0044403 A1 | 2/2013 | Urienza | |
| 2013/0314060 A1* | 11/2013 | Chen | G05F 1/46 |
| | | | 323/234 |
| 2014/0097822 A1* | 4/2014 | Chou | H02M 1/32 |
| | | | 323/311 |
| 2014/0307486 A1* | 10/2014 | Huang | H02M 1/32 |
| | | | 363/21.16 |

FOREIGN PATENT DOCUMENTS

| | | |
|---|---|---|
| TW | 201112603 | 4/2011 |
| TW | 201138253 | 11/2011 |
| TW | 201310840 | 3/2013 |
| TW | 201312908 | 3/2013 |
| TW | I395396 | 5/2013 |
| TW | 201332268 | 8/2013 |
| TW | I404287 | 8/2013 |

* cited by examiner

POWER SUPPLY APPARATUS WITH DISCHARGE CIRCUIT

CROSS-REFERENCE TO RELATED APPLICATION

This application claims the priority benefit of Taiwan application serial no. 103112580, filed on Apr. 3, 2014. The entirety of the above-mentioned patent application is hereby incorporated by reference herein and made a part of this specification.

BACKGROUND

1. Technical Field

The invention relates to a power supply apparatus. Particularly, the invention relates to a power supply apparatus in which a bleeder resistor is omitted to decrease energy loss.

2. Related Art

A main effect of a power supply apparatus is to convert an alternating current (AC) input power with a high voltage and low stability that is provided by a power company into a direct current (DC) output power with a low voltage and high stability and suitable for the use of various electronic devices, and the DC output power is provided to electronic devices such as computers, office automation equipment, industrial control equipment, and communication equipment for usage.

In the conventional power supply apparatus, an electromagnetic interference (EMI) filter is generally disposed in a front-end stage, and an AC safety capacitor in the EMI filter is used to filter noises probably existed in an AC signal. As the capacitor has a characteristic of storing electric energy, in the structure of the conventional power supply apparatus, a bleeder resistor is further configured in the EMI filter to connect the AC safety capacitor in parallel, such that when an AC power of the power supply apparatus is turned off, the AC safety capacitor can discharge the electric energy through the bleeder resistor to avoid a risk of electric shock of a user. However, the bleeder resistor may cause an extra power loss during the operation of the power supply apparatus.

SUMMARY

The invention is directed to a power supply apparatus, in which discharge of electric energy of an AC safety capacitor is implemented under a premise that a bleeder resistor is not configured.

The invention provides a power supply apparatus including a power conversion circuit, an AC safety capacitor and a control unit. The power conversion circuit receives an AC input voltage through an input side, and converts the AC input voltage into a DC output voltage. The AC safety capacitor is connected across the input side. The control unit controls an operation of the power conversion circuit, where the control unit samples and holds a voltage between two terminals of the AC safety capacitor to obtain a holding voltage, and compares the holding voltage and the AC input voltage during each period of a clock signal, so as to decide whether to execute a discharge operation to discharge electric energy stored in the AC safety capacitor according to a comparison result.

In an embodiment of the invention, the control unit determines whether a duty cycle of a detection signal is within a normal working range during a predetermined period. When the duty cycle of the detection signal is continuously out of the normal working range during the predetermined period, the control unit determines that a signal form of the detection signal is not matched with a normal working condition.

In an embodiment of the invention, the predetermined period is at least one period of the clock signal.

In an embodiment of the invention, the control unit obtains the detection signal according to the comparison result of the holding voltage and the AC input voltage. When the control unit determines that the duty cycle of the detection signal is within the normal working range, the control unit does not execute the discharge operation, and when the control unit determines that the duty cycle of the detection signal is outside the normal working range, the control unit executes the discharge operation.

In an embodiment of the invention, the control unit includes a rectifier circuit, which is coupled to the power conversion circuit and the AC safety capacitor, and rectifies the AC input voltage to generate a rectified voltage.

In an embodiment of the invention, the control unit includes a sampling circuit, a holding circuit and a comparison circuit. The sampling circuit is coupled to the rectifier circuit, and samples a peak level of the rectified voltage to obtain a peak voltage during a first period of the clock signal. The holding circuit is coupled to the sampling circuit, and holds the peak voltage sampled by the sampling circuit during the first period at a second period following the first period, and accordingly generates the holding voltage. The comparison circuit is coupled to an input terminal of the sampling circuit and an output terminal of the holding circuit to compare the holding voltage and the rectified voltage related to the AC input voltage, so as to output the detection signal.

In an embodiment of the invention, the sampling circuit includes a first operational amplifier and a diode. A first input terminal of the first operational amplifier receives the rectified voltage. An anode of the diode is coupled to an output terminal of the first operational amplifier, and a cathode of the diode is coupled to a second input terminal of the first operational amplifier, and is configured to output the peak voltage.

In an embodiment of the invention, the holding circuit includes a switch, a holding capacitor and a second operational amplifier. A first terminal of the switch is coupled to the cathode of the diode, where the switch is turned on or turned off according to the clock signal. A first terminal of the holding capacitor is coupled to a second terminal of the switch, and a second terminal thereof is coupled to a ground terminal. A first input terminal of the second operational amplifier is coupled to the first terminal of the holding capacitor, and an output terminal thereof is coupled to a second input terminal thereof and outputs the holding voltage.

In an embodiment of the invention, the comparison circuit includes a third operational amplifier, where a first input terminal thereof receives the rectified voltage, a second input terminal thereof is coupled to the output terminal of the second operational amplifier to receive the holding voltage, and an output terminal thereof outputs the detection signal.

In an embodiment of the invention, the control unit further includes a discharge determination circuit coupled to the output terminal of the comparison circuit to receive the detection signal, where the discharge determination circuit determines whether a signal form of the detection signal is matched with a normal working condition, and accordingly determines whether to send a discharge control signal.

In an embodiment of the invention, the control unit further includes a discharge circuit, which determines whether to enable a discharge path between the AC safety capacitor and a ground terminal according to a discharge control signal, where when the discharge circuit receives the discharge control signal, the discharge circuit enables the discharge path, so as to discharge the electric energy stored in the AC safety capacitor to the ground terminal, and when the discharge circuit does not receive the discharge control signal, the discharge circuit disables the discharge path.

In an embodiment of the invention, the discharge circuit includes a controllable load or a voltage-controlled current source.

In an embodiment of the invention, the power conversion circuit further includes a choke, a full bridge rectifier circuit, a filter capacitor and a transformer conversion circuit. The choke is coupled to the AC safety capacitor, and receives the AC input voltage, and filters a power noise in the AC input voltage. The full bridge rectifier circuit is coupled to the choke and performs a full wave rectification on the AC input voltage filled by the choke to generate an input voltage. The filter capacitor is coupled to the full bridge rectifier circuit, and filters the input voltage. The transformer conversion circuit is coupled to the full bridge rectifier circuit and the filter capacitor, and is controlled by the control unit to transform and convert the received input voltage, so as to generate the DC output voltage.

According to the above descriptions, the power supply apparatus of the invention compares the holding voltage and the AC input voltage during each period, so as to learn whether the AC input voltage is stably provided according to whether the detection signal is in the normal working range, and accordingly decide to discharge the electric emery stored in the AC safety capacitor. In this way, usage of a bleeder resistor is omitted, so that energy loss of the power supply apparatus is decreased to achieve a power saving effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
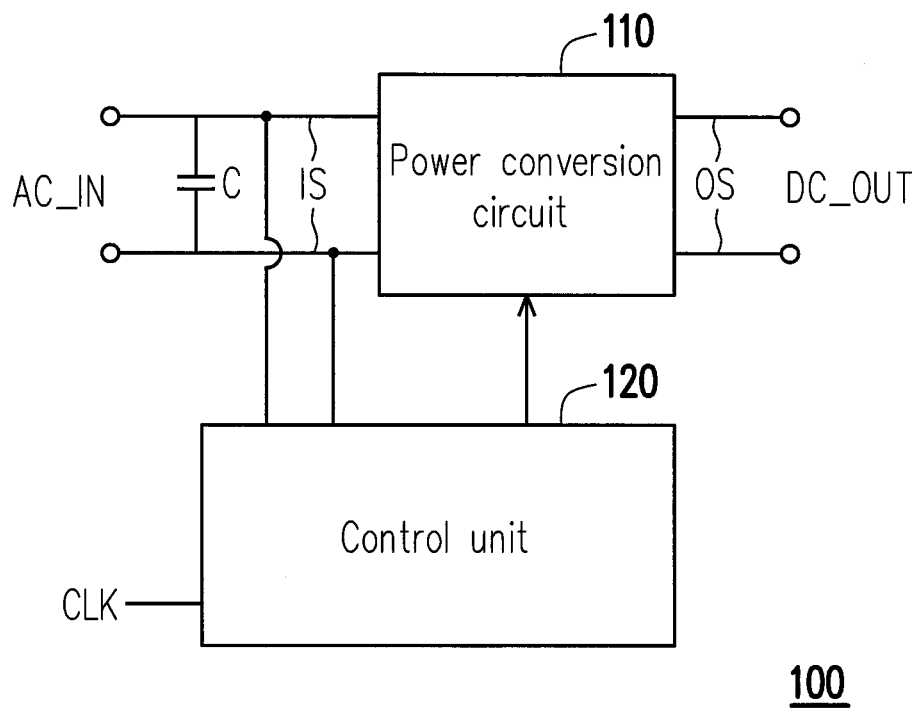
FIG. 1 is a circuit schematic diagram of a power supply apparatus according to an embodiment of the invention.

In a general power supply apparatus, a bleeder resistor used for discharging electric energy stored in an AC safety capacitor may cause extra power loss of the power supply apparatus during operation. Therefore, the invention provides a power supply apparatus, which is capable of periodically detecting whether an AC input voltage is stably provided during the operation of the power supply apparatus, and accordingly determining whether to execute a discharge operation to discharge the electric energy stored in the AC safety capacitor. In this way, usage of the bleeder resistor is omitted, so as to decrease the energy loss of the power supply apparatus to achieve a power saving effect. In order to fully convey the spirit of the invention, embodiments of the invention are provided below. Wherever possible, the same reference numbers are used in the drawings and the description to refer to the same or like parts.

FIG. 1 is a circuit schematic diagram of a power supply apparatus 100 according to an embodiment of the invention. Referring to FIG. 1, in the present embodiment, the power supply apparatus 100 is an AC-DC conversion power supply apparatus, and includes a power conversion circuit 110, an AC safety capacitor C and a control unit 120. The power conversion circuit 110 receives an AC input voltage AC_IN (for example, a city power, i.e. a sine wave with a frequency of 60 Hz, though the invention is not limited thereto) through an input side IS, and converts the AC input voltage AC_IN into a DC output voltage DC_OUT, and outputs the DC output voltage DC_OUT to a load through an output side OS. In the present embodiment, the power conversion circuit 110 can be a full bridge power converter, and may include a full bridge rectifier used for full wave rectification, and a filter capacitor filter capacitor used for filtering an output of the full bridge rectifier. In other embodiments, other types of power converter can also be applied, such as a half bridge power converter, a forward power converter, a fly back power converter or a push-pull power converter, and the type of the power conversion circuit is not limited by the invention.

The AC safety capacitor C is connected across two ends of the input side IS to filter/suppress ad noise probably existed in the AC input voltage AC_IN. The control unit 120 is, for example, a pulse width modulation (PWM) control chip, which is used for controlling an operation of the power conversion circuit 110. In the present embodiment, the control unit 120 samples and holds a voltage between two terminals of the AC safety capacitor C to obtain a holding voltage, and compares the holding voltage and the AC input voltage AC_IN during each period of a clock signal CLK, so as to decide whether to execute a discharge operation to discharge electric energy stored in the AC safety capacitor C according to a comparison result. A frequency of the clock signal CLK is related to the frequency of the AC input voltage AC_IN.

In detail, in an exemplary embodiment, the control unit 120 can obtain a detection signal according to a comparison result of the holding voltage and the AC input voltage AC_IN. When the control unit 120 determines that a signal form of the detection signal is matched with a normal working condition (for example, a duty cycle of the detection signal is within a normal working range during a predetermined period), the control unit 120 does not execute the discharge operation, and when the control unit 120 determines that the signal form of the detection signal is not matched with the normal working condition, the control unit 120 execute the discharge operation. Based on the above operation method of the control unit 120, the control unit 120 of the present embodiment can detect whether the AC input voltage is stably provided according to whether the working condition is satisfied, so as to determine whether to execute the discharge operation, such that the bleeder resistor can be omitted to resolve the problem of energy loss caused by the bleeder resistor.

Figure 2:
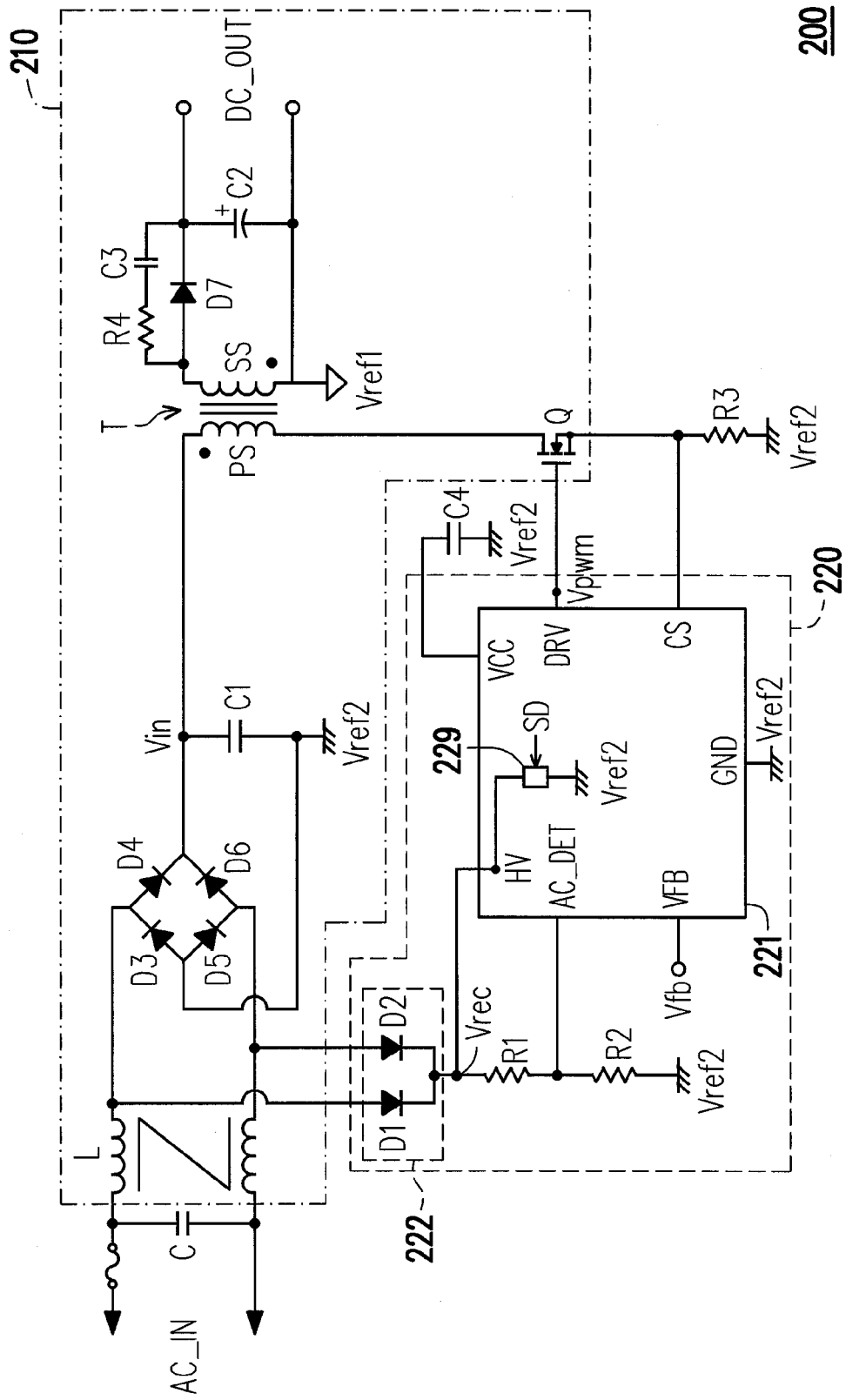
FIG. 2 is a circuit diagram of a power supply apparatus according to another embodiment of the invention.

A detailed structure of the power supply apparatus of FIG. 1 is described below with reference of FIG. 2. FIG. 2 is a schematic diagram of the power supply apparatus according to another embodiment of the invention. Referring to FIG. 2, the power supply apparatus 200 includes a power conversion circuit 210, an AC safety capacitor C and a control unit 220. In the present embodiment, the power conversion circuit 210 includes a choke L, a full bridge rectifier circuit (for example, composed of diodes D3-D6), a filter capacitor C1 and a transformer conversion circuit (for example, composed of a power switch Q, a transformer T, a diode D7, capacitors C2 and C3 and a resistor R4).

The choke L, for example, has two conjugate coils. The two conjugate coils are coupled to two terminals of the AC safety capacitor C for receiving the AC input voltage AC_IN, where the choke L can be used to filter a power noise input to the power conversion circuit 210.

The full bridge rectifier circuit composed of the diodes D3-D6 are coupled to the choke L, where a cathode of the diode D3 and an anode of the diode D4 are commonly coupled to one of the conjugate coils of the choke L, and a cathode of the diode D5 and an anode of the diode D6 are commonly coupled to the other one of the conjugate coils of the choke L. The full bridge rectifier circuit receives the noise-suppressed AC input voltage AC_IN, and performs a full wave rectification on the AC input voltage AC_IN to generate an input voltage Vin. A first terminal of the filter capacitor C1 is coupled to cathodes of the diodes D4 and D6, and a second terminal of the filter capacitor C1 is coupled to a second ground terminal Vref2. The filter capacitor C1 is used for filtering the input voltage Vin generated by the full bridge rectifier circuit.

In the transformer conversion circuit, the transformer T has a primary side PS and a secondary side SS. A common-polarity terminal of the primary side PS of the transformer T is coupled to the first terminal of the filter capacitor C1 for receiving the input voltage Vin. The power switch Q is, for example, an N-type transistor, and a first terminal (a drain) thereof is coupled to an opposite-polarity terminal of the primary side PS of the transformer T, and the power switch Q is switched under control of a driving signal Vpwm generated by the control unit 220. An anode of the diode D7 is coupled to an opposite-polarity terminal of the secondary side SS of the transformer T. Moreover, a first terminal of the capacitor C2 is coupled to a cathode of the diode D7, and a second terminal of the capacitor C2 and a common-polarity terminal of the secondary side SS of the transformer T are commonly coupled to a first ground terminal Vref1. The resistor R4 and the capacitor C3 are connected in series and are connected across two terminals of the diode D7. Therefore, the transform T induces an induction voltage related to the input voltage Vin at the secondary side SS in response to switching of the power switch Q and a turns ratio of the coils of the primary side PS and the secondary side SS. The induction voltage is converted into the DC output voltage DC_OUT under functions of the diode D7, the resistor R4 and the capacitors C2 and C3. In other words, the transformer conversion circuit can transform and convert the output of the filter capacitor C1 into the DC output voltage DC_OUT in response to the driving signal Vpwm.

In the present embodiment, the control unit 220 may include a control chip 221 and a rectifier circuit 222. The rectifier circuit 222 is coupled to the power conversion circuit 210 and the AC safety capacitor C, and rectifies the AC input voltage AC_IN to generate a rectified voltage Vrec. In the present embodiment, the rectifier circuit 222 can be a half wave rectifier circuit composed of a diode D1 and a diode D2, where anodes of the diodes D1 and D2 receive the AC input voltage AC_IN, and cathodes of the diodes D1 and D2 provide the rectified voltage Vrec.

The control chip 221 has a plurality of pins for receiving or outputting signals, for example, a power pin VCC, a ground pin GND, a high voltage pin HV, an output pin DRV, a feedback pin VFB, a current detection pin CS, an AC power detection pin PC_DET, etc. The control chip 221 can receive a required operation voltage through the power pin VCC, and is coupled to the second ground terminal Vref2 through the ground pin GND, such that the control chip 221 can normally operate, and regulates the received operation voltage to generate a working voltage required by various functional circuits in the control chip 221. In the present embodiment, the control chip 221 can receive the rectified voltage Vrec related to the AC input voltage AC_IN through the high voltage pin HV, and the rectified voltage Vrec is regulated by an internal circuit of the control chip 221 to serve as the operation voltage thereof. In other embodiment, the control chip 221 can also receive a DC input voltage from external to serve as the operation voltage thereof. A bypass capacitor C4 is coupled between the power pin VCC of the control chip 221 and the second ground terminal Vref2, and is used for decreasing a power noise input to the control chip 221, so as to stabilize the operation of the control chip 221. The bypass capacitor C4 can be selectively used according to a design requirement.

The control unit 220 can generate and output the aforementioned driving signal Vpwm through the output pin DRV of the control chip 221 to control switching of the power switch Q, such that the transformer conversion circuit 210 outputs the DC output voltage DC_OUT. The feedback pin VFB of the control chip 221 can be coupled to the secondary side SS of the transformer T through a feedback circuit (not shown), where the feedback circuit receives the DC output voltage DC_OUT, and provides a feedback signal Vfb related to a load state to the feedback pin VFB of the control chip 221. It should be noticed that any circuit (for example, a feedback circuit using a resistive voltage divider) capable of outputting the feedback signal related to the load state can be used as the feedback circuit of the invention, so that an implementation pattern of the feedback circuit is not limited by the invention.

Regarding the current detection pin CS of the control chip 221, a resistor R3 coupled between a second terminal of the power switch Q and the second ground terminal Vref2 can be used to detect a current flowing through the power switch Q. According to an actual design or application requirement, those skilled in the art can add other functional pins to the control chip 221, for example, an over voltage detection pin, an over current detection pin, etc., or delete the existing functional pins of the control chip 221, which is not limited by the invention.

It should be noticed that in the present embodiment, the control unit 220 further receives the rectified voltage Vrec through the AC power detection pin AC_DET of the control chip 221. Therefore, the control unit 220 can obtained the corresponding holding voltage according to the rectified voltage Vrec through a circuit design of the control chip 221, and determines whether the power supply apparatus 200 has a stable AC power supply according to a comparison result of the holding voltage and the rectified voltage Vrec, so as to decide whether to discharge the AC safety capacitor C. In this way, usage of the bleeder resistor is omitted to achieve an energy saving effect. Moreover, in the circuit structure of FIG. 2, the control unit 200 further includes a voltage dividing circuit composed of resistor R1 and R2. The voltage dividing circuit is coupled between the rectifier circuit 222 and the second ground terminal Vref2, and divides the rectified voltage Vrec for providing to the AC power detection pin AC_DET of the control chip 221, so as to avoid damage of the control chip 221 due to excessively high voltage.

Figure 3:
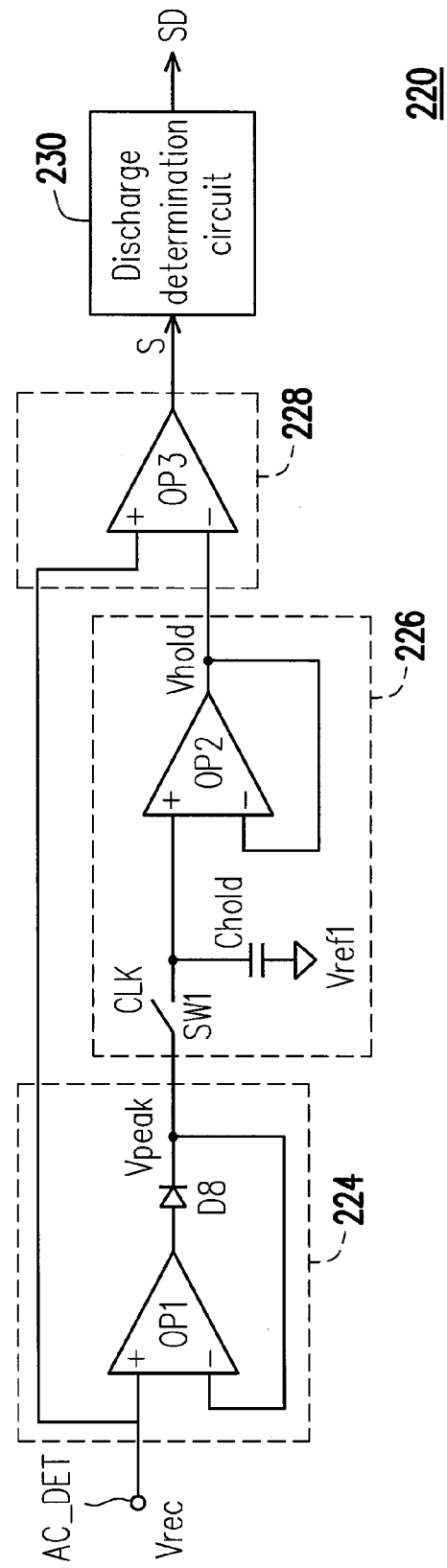
FIG. 3 is a circuit diagram of a control unit according to an embodiment of the invention.
Figure 4:
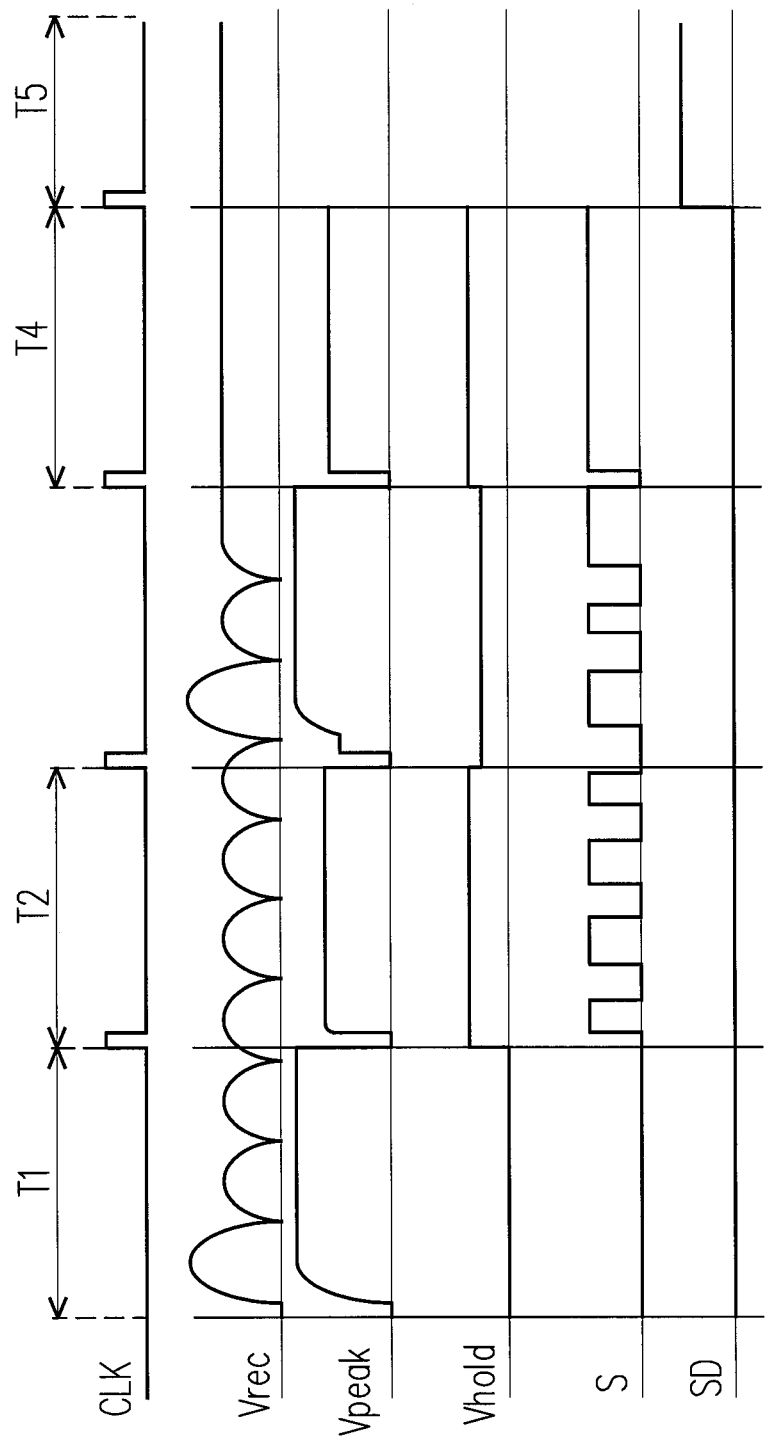
FIG. 4 is an operation timing diagram of a control unit according to an embodiment of the invention.

In order to clearly describe a detailed structure and an operation method of the control unit of the invention, examples of FIG. 3 and FIG. 4 are provided below for description, where FIG. 3 is a circuit diagram of the control unit 220 according to an embodiment of the invention, and FIG. 4 is an operation timing diagram of the control unit 220 according to an embodiment of the invention.

Referring to FIG. 3, the control unit 220 further includes a sampling circuit 224, a holding circuit 226, a comparison circuit 228 and a discharge determination circuit 230. The sampling circuit 224 is coupled to the rectifier circuit 222 through the AC power detection pin AC_DET of the control chip 221 in FIG. 2. The sampling circuit 224 includes an operational amplifier OP1 and a diode D8. A non-inverting input terminal of the operational amplifier OP1 receives the rectified voltage Vrec. An anode of the diode D8 is coupled to an output terminal of the operational amplifier OP1, and a cathode of the diode D8 is coupled to an inverting input terminal of the operational amplifier OP1.

The holding circuit 226 is coupled to the sampling circuit 224, and includes a switch SW1, a holding capacitor Chold and an operational amplifier OP2. A first terminal of the switch SW1 is coupled to the cathode of the diode D8, and the switch SW1 is turned on or turned off according to the clock signal CLK. A first terminal of the holding capacitor Chold is coupled to a second terminal of the switch SW1, and a second terminal of the holding capacitor Chold is coupled to the first ground terminal Vref1. A non-inverting input terminal of the operational amplifier OP2 is coupled to the first terminal of the holding capacitor Chold, and an output terminal and an inverting input terminal of the operational amplifier OP2 are coupled to each other.

The comparator 228 is coupled to the non-inverting input terminal of the operational amplifier OP1 and the output terminal of the operational amplifier OP2, and compares the holding voltage Vhold and the rectified voltage Vrec related to the AC input voltage AC_IN, so as to output a detection signal S. In the present embodiment, the comparison circuit 228 includes an operational amplifier OP3, where a non-inverting input terminal of the operational amplifier OP3 receives the rectified voltage Vrec, an inverting input terminal receives the holding voltage Vhold, and an output terminal outputs the detection signal S according to a comparison result of the rectified voltage Vrec and the holding voltage Vhold.

The discharge determination circuit 230 is coupled to an output terminal of the comparison circuit 228 (i.e. the output terminal of the operational amplifier OP3) for receiving the detection signal S. The discharge determination circuit 230 determines whether a duty cycle of the detection circuit S is within a normal working range (for example, 10%-90%, though the invention is not limited thereto), and accordingly determines whether to send a discharge control signal SD to execute the discharge operation.

It should be noticed that the diode D8 of the sampling circuit 224 is used for further rectifying the output result of the operational amplifier OP1. In some embodiments, the diode D8 of the sampling circuit 224 can also be omitted, and a peak voltage Vpeak of the operation result of the operational amplifier OP1 is directly obtained, which is not limited by the invention.

It should be noticed that the holding circuit 226 may further adjust a ratio of voltage levels of the holding voltage Vhold and the peak voltage Vpeak. In an exemplary embodiment, the voltage levels of the holding voltage Vhold and the peak voltage Vpeak can be the same/similar. In some embodiments, the holding circuit 226 can also change the voltage level of the holding voltage Vhold through a circuit design or by suitably control an operation timing. For example, when the operational amplifier OP2 is connected in series with a resistor, the holding circuit 226 can change the voltage level of the holding voltage Vhold through resistive voltage division. Alternatively, in another exemplary embodiment, by adjusting the duty cycle of the clock signal CLK, for example, decreasing a time ratio of an enabling level of the clock signal CLK lasting in a period, a time for the holding capacitor Chold storing the peak voltage Vpeak is limited, so as to decrease the voltage level of the holding voltage Vhold.

Moreover, in the present embodiment, the holding voltage Vhold can be set to 0.8 of the voltage level of the peak voltage Vpeak. Those skilled in the art may use different adjusting methods to adjust the holding voltage Vhold according to an actual design equipment, and suitably select the ratio beween the voltage levels of the holding voltage Vhold and the peak voltage Vpeak, though the invention is not limited thereto. In other embodiments, the sampling circuit 224 and the holding circuit 226 may simultaneously achieve the sampling and holding effect through a combination circuit, and the method for sampling and holding the peak voltage Vpeak to obtain the holding voltage Vhold is not limited by the invention.

The circuit operation timing of the embodiment of FIG. 3 is described below. Referring to FIG. 3 and FIG. 4, during a first period T1 of the clock signal CLK, the sampling circuit 224 samples a peak level of the rectified voltage Vrec to obtain the peak voltage Vpeak corresponding to the first period T1.

When the power supply apparatus 200 enters a second period T2 from the first period T1, the switch SW1 is turned on in response to the clock signal CLK of an enabling level (for example, a high voltage level), and the holding voltage Chold stores the peak voltage Vpeak corresponding to the first period T1 during the second period T2, and provides the same to the operational amplifier OP2. Therefore, the operational amplifier OP2 generates the corresponding holding voltage Vhold during the second period T2 according to the voltage stored in the holding capacitor Chold. In other words, the holding voltage Vhold generated by the operational amplifier OP2 during each period corresponds to the peak voltage Vpeak of the previous period.

During the second period T2, the operational amplifier OP3 compares the rectified voltage Vrec related to the AC input voltage AC_IN and the holding voltage Vhold generated by the operational amplifier OP2 to generate the detection signal S. In case that the AC input voltage AC_IN is normally supplied, since the holding voltage Vhold is approximately within a range between a maximum value and a minimum value of the rectified voltage Vrec, the operational amplifier OP3 generates the detection signal S with a pulse wave form (for example, the detection signal S in the second period T2 of FIG. 4). Comparatively, in case that supply of the AC input voltage AC_IN is abnormal, since the rectified voltage Vrec related to the AC input voltage AC_IN is continuously in a DC form, the operational amplifier OP3 generates the detection signal S with a DC form (for example, the detection signal S in a fourth period T4 of FIG. 4).

Therefore, in an exemplary embodiment, the discharge determination circuit 230 can determine whether a signal form of the detection signal S is matched with a normal working condition according to whether the duty cycle of the detection signal is within a normal working range during a predetermined period (which can be set to one or a plurality of periods of the clock signal CLK according to a design requirement of a designer, which is not limited by the invention), so as to determine whether to send the discharge control signal SD to execute the discharge operation.

For example, it is assumed that the predetermined period is set to a time length of one period of the clock signal CLK as that shown in FIG. 4, when the discharge determination circuit 230 determines that the duty cycle of the detection signal S generated by the operational amplifier OP3 during the second period T2 is within the normal working range, it represents that the signal form of the detection signal S is matched with the normal working condition. Therefore, the discharge determination circuit 230 generates the discharge control signal SD with a disabling level (for example, a low voltage level, which is equivalent to a situation that the discharge control signal SD is not sent), and the control unit 220 does not discharge the AC safety capacitor C in response to the discharge control signal SD with the disabling level. Comparatively, during the fourth period T4, since the rectified voltage Vrec corresponding to the AC input voltage AC_IN no longer has the characteristic of multiple pulses of the AC signal, the duty cycle of the detection signal S is continuously in an abnormal working range (i.e. outside the normal working range) during the fourth period T4, which represents that the signal form of the detection signal S is not matched with the normal working condition. Therefore, when the discharge determination circuit 230 determines that the signal form of the detection signal S is not matched with the normal working condition, the discharge determination circuit 230 generates the discharge control signal SD of the enabling level (for example, a high voltage level, which is equivalent to a situation that the discharge control signal SD is sent) during a next period (i.e. a fifth period T5), and the control unit 220 discharges the AC safety capacitor C in response to the discharge control signal SD with the enabling level. Regarding an operation of discharging the AC safety capacitor C, a discharge circuit can be enabled through the discharge control signal SD, so as to create a discharge path of the AC safety capacitor C to discharge the electric energy therein.

Referring to FIG. 2 for description of the discharge circuit, the discharge circuit 229 can determine whether to enable a discharge path between the AC safety capacitor C and the second ground terminal Vref2 according to enabling (for example, the high voltage level) or disabling (for example, the low voltage level) of the discharge control signal SD, so as to discharge the electric energy stored in the AC safety capacitor C. The discharge path can be implemented by a controllable load (for example, a combination circuit composed of a switch and a resistor connected in series) coupled between the high voltage pin HV and the second ground terminal Vref2, though the invention is not limited thereto. In another embodiment, the discharge circuit 229 can also be implemented by a voltage-controlled current source. The circuit implementation of the controllable load and a circuit implementation for discharging the electric energy stored in the AC safety capacitor C are not limited by the invention.

It should be noticed that although the predetermined period is assumed to be a time length of one period of the clock signal CLK in the embodiment of FIG. 4, the invention is not limited thereto. In another exemplary embodiment, the discharge determination circuit 230 can also generate the discharge control signal SD with the enabling level during a next period when determining that the duty cycle of the detection signal S does not belong to the normal working range for more than two periods of the clock signal CLK, and the control unit 220 discharges the AC safety capacitor C in response to the discharge control signal SD of the enabling level.

For example, it is assumed that that predetermined period is set to 4 periods of the clock signal CLK, and the discharge determination circuit 230 determines that the signal form of the detection signal S is not matched with the normal working condition only when determining that the duty cycle of the detection signal S is out of the normal working range for 4 periods, so as to execute the discharge operation. In other words, as long as the duty cycle of the detection signal S is back to the normal working range during the 4 periods, the discharge determination circuit 230 does not execute the discharge operation, so as to avoid misjudge caused by the noise of the AC input voltage AC_IN.

Therefore, by using the circuit structure of the aforementioned control unit 220, the holding voltage Vhold and the rectified voltage Vrec are compared during each period of the clock signal CLK, so as to learn whether the AC input voltage AC_IN is stably provided according to whether the detection signal S is within the normal working range. Moreover, once the control unit 220 determines that the AC input voltage AC_IN is not stably provided to the power supply apparatus 200, the discharge operation can be immediately performed to the AC safety capacitor C in a next period. Therefore, whether the AC input voltage is stably provided to the power supply apparatus 200 can be detected in real-time, and usage of the bleeder resistor is omitted to decrease a power loss.

Moreover, the ratio of the voltage levels of the holding voltage Vhold and the peak voltage Vpeak can be adjusted through the holding circuit 226, in this way, when a signal intensity of the AC input voltage AC_IN is weaker, the control unit 220 can still determine the AC input voltage AC_IN as an unstable input source according to the voltage level of the holding voltage Vhold, and discharges the AC safety capacitor C and stops input of the AC input voltage AC_IN, so as to ensure that the AC input voltage AC_IN received by the power supply apparatus 200 has a stable signal intensity.

In summary, the power supply apparatus of the invention compares the holding voltage and the AC input voltage during each period, so as to learn whether the AC input voltage is stably provided according to whether the detection signal is in the normal working range, and accordingly decide to discharge the electric emery stored in the AC safety capacitor. In this way, whether the power supply apparatus is supplied with a stable AC input voltage is detected in real-time, and usage of the bleeder resistor is omitted, so as to decrease a power loss of the power supply apparatus to achieve a power saving effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A power supply apparatus, comprising:
a power conversion circuit, receiving an alternating current (AC) input voltage through an input side, and converting the AC input voltage into a direct current (DC) output voltage;
an AC safety capacitor, connected across the input side; and
a control unit, configured to control an operation of the power conversion circuit, wherein the control unit samples and holds a voltage between two terminals of the AC safety capacitor to obtain a holding voltage, and compares the holding voltage and the AC input voltage during each period of a clock signal, so as to decide whether to execute a discharge operation to discharge electric energy stored in the AC safety capacitor according to a comparison result,
wherein the control unit comprises:
a rectifier circuit, coupled to the power conversion circuit and the AC safety capacitor, and rectifying the AC input voltage to generate a rectified voltage;

a sampling circuit, coupled to the rectifier circuit, and sampling a peak level of the rectified voltage to obtain a peak voltage during a first period of the clock signal;

a holding circuit, coupled to the sampling circuit, and holding the peak voltage sampled by the sampling circuit during the first period at a second period following the first period, and accordingly generating the holding voltage; and a comparison circuit, coupled to an input terminal of the sampling circuit and an output terminal of the holding circuit to compare the holding voltage and the rectified voltage related to the AC input voltage, so as to output a detection signal.

2. The power supply apparatus as claimed in claim 1, wherein the control unit obtains a detection signal according to the comparison result of the holding voltage and the AC input voltage, the control unit does not execute the discharge operation when determining that a signal form of the detection signal is matched with a normal working condition, and the control unit executes the discharge operation when determining that the signal form of the detection signal is not matched with the normal working condition.

3. The power supply apparatus as claimed in claim 2, wherein the control unit determines whether a duty cycle of the detection signal is within a normal working range during a predetermined period, and when the duty cycle of the detection signal is continuously out of the normal working range during the predetermined period, the control unit determines that the signal form of the detection signal is not matched with the normal working condition.

4. The power supply apparatus as claimed in claim 3, wherein the predetermined period is at least one period of the clock signal.

5. The power supply apparatus as claimed in claim 1, wherein the sampling circuit comprises:

a first operational amplifier, having a first input terminal receiving the rectified voltage; and a diode, having an anode coupled to an output terminal of the first operational amplifier, and a cathode coupled to a second input terminal of the first operational amplifier, and configured to output the peak voltage.

6. The power supply apparatus as claimed in claim 5, wherein the holding circuit comprises:

a switch, having a first terminal coupled to the cathode of the diode, wherein the switch is turned on or turned off according to the clock signal;

a holding capacitor, having a first terminal coupled to a second terminal of the switch, and a second terminal coupled to a ground terminal; and a second operational amplifier, having a first input terminal coupled to the first terminal of the holding capacitor, and an output terminal coupled to a second input terminal thereof and outputting the holding voltage.

7. The power supply apparatus as claimed in claim 6, wherein the comparison circuit comprises:

a third operational amplifier, having a first input terminal receiving the rectified voltage, a second input terminal coupled to the output terminal of the second operational amplifier to receive the holding voltage, and an output terminal outputting the detection signal.

8. The power supply apparatus as claimed in claim 1, wherein the control unit further comprises:

a discharge determination circuit, coupled to the output terminal of the comparison circuit to receive the detection signal, wherein the discharge determination circuit determines whether a signal form of the detection signal is matched with a normal working condition, and accordingly determines whether to send a discharge control signal.

9. The power supply apparatus as claimed in claim 1, wherein the control unit further comprises:

a discharge circuit, configured to determine whether to enable a discharge path between the AC safety capacitor and a ground terminal according to a discharge control signal, wherein when the discharge circuit receives the discharge control signal, the discharge circuit enables the discharge path, so as to discharge the electric energy stored in the AC safety capacitor to the ground terminal, and when the discharge circuit does not receive the discharge control signal, the discharge circuit disables the discharge path.

10. The power supply apparatus as claimed in claim 9, wherein the discharge circuit comprises a controllable load or a voltage-controlled current source.

11. The power supply apparatus as claimed in claim 1, wherein the power conversion circuit further comprises:

a choke, coupled to the AC safety capacitor, receiving the AC input voltage, and filtering a power noise in the AC input voltage;

a full bridge rectifier circuit, coupled to the choke, and performing a full wave rectification on the AC input voltage filtered by the choke to generate an input voltage;

a filter capacitor, coupled to the full bridge rectifier circuit, and filtering the input voltage; and a transformer conversion circuit, coupled to the full bridge rectifier circuit and the filter capacitor, and controlled by the control unit to transform and convert the received input voltage, so as to generate the DC output voltage.

* * * * *